Jan. 26, 1965 J. M. HARKER ETAL 3,167,216

CHIP CELL AND ACCESS MECHANISM

Filed Oct. 28, 1963

INVENTORS
JOHN M. HARKER
DONALD D. LAINE
JOHN J. LYNOTT

BY John L. Jackson

ATTORNEY

1

3,167,216

CHIP CELL AND ACCESS MECHANISM

John M. Harker, Palo Alto, Donald D. Laine, Redondo Beach, and John J. Lynott, Los Gatos, Calif., assignors to International Business Machines Corporation, New York, N.Y., a corporation of New York Filed Oct. 28, 1963, Ser. No. 319,395
9 Claims. (Cl. 221—88)

This invention relates to information storage systems in general and more particularly to information storage systems wherein the basic storage media is a discrete record member, a number of which are stored in cells for transport to and from a remote access station.

On one end of the spectrum of information storage systems is the rapid access, high cost per information unit system, while on the other end of the spectrum is the type of system wherein rapid access rates are traded for larger and less expensive storage capabilities. It is with this latter type of large storage capacity system that the present invention is concerned. While the cell and access mechanism to be hereinafter described can be used in either a magnetic data or image data application, it will be described in an image storage application. Special problems are encountered in an image storage and retrieval system which are not encountered in a system wherein only magnetic data is stored on chips. Thus, for instance, dust or other similar type particles, while being undesirable in a magnetic storage system, cannot be tolerated in an image storage system wherein images are stored in greatly reduced size and are then blown up at a later time for retrieval. Likewise, due to the relative softness of the emulsion, scratching is a major problem.

One prior art discrete film chip system avoided emulsion damage by storing the film chips in cells and holding them in edge slots placed on .025" centers. While this technique prevented the damaging of the emulsion, other problems were attendant. Obviously, storage density was limited thereby to a certain extent defeating one of the prime objects of image storage and retrieval systems. Additionally, the mechanisms used to access desired chips had to be quite refined since after the cell had been positioned at the accessing mechanism, a vernier selection had to be made to access the desired chip from the cell. Moreover, the accessing head had to the quite narrow to prevent damaging adjacent chips.

It is, therefore, an object of the present invention to provide a novel data chip cell and access mechanism.

Another object of the present invention is to provide a chip storage system wherein in one embodiment the chips are stored in intimate contact with spacers to alleviate dust and emulsion damage problems while providing a high storage density cell.

Another object of the present invention is to provide a chip cell and access mechanism wherein the data chips, either photosensitive or magnetic, are air cleaned during accessing.

Another object of the present invention is to provide a chip cell and access mechanism wherein the data chips, either photosensitive of magnetic, are air cleaned during accessing.

Another object of the present invention is to provide a chip cell which is rigid and capable of pneumatic transport.

Another object of the present invention is to provide a chip cell and accessing combination wherein any one of the data chips contained in the cell may be accessed without vernier positioning of either the chip cell or accessing head.

Another object of the present invention is to provide a chip cell and access mechanism wherein filmi chips are stored in cells and are separated by thin, soft, nonabrasive spacers which, during accessing, are lubricated by an air bearing to prevent emulsion abrasion.

2

Other and further objects and advantages of the invention will be apparent from the following more particular description of the preferred embodiment of the invention, as illustrated in the accompanying drawings in which:

FIG. 1*a* is a frontal view of a chip cell;

FIG. 1*b* is a top view of a chip cell illustrating the arrangement of chips and tabbed spacers;

Briefly, in the preferred embodiment, a sandwich clipboard type cell is spring-loaded shut to hold a plurality of film chips and tabbed spacers. The cell can be opened either by squeezing the bottom or by spreading the top. A pinch roller access slot is provided in each of two side plates of the cell. In selecting a particular chip to be accessed by a picker head having a fixed picking axis, the cell is first transported to the input/output station and positioned beneath the picker head. Pinch rollers are inserted in the side plates of the cell to hold the chips and spacers rigid. The cell is then pinched at the lower extremity to open it. Tab spreaders are next utilized to isolate the desired chip. An air stream is then played onto the selected chip which not only provides an air bearing for removal of the selected chip, but, additionally, centers the upper extremity of the selected chip on the picking axis of the picker head. Thus, the picker head may remain fixed with respect to the pack while picking any chip in the pack. In replacing an accessed chip, the reverse of the above sequence is followed.

Figures 1A, 1B:
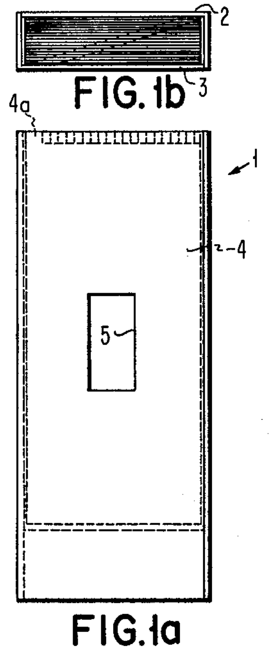
Figure 2:
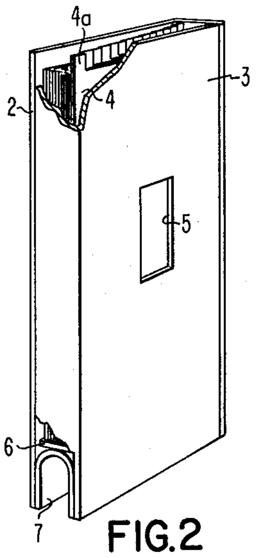
FIG. 2 is a partial cutaway perspective of a chip cell containing chips and tabbed spacers.

In FIG. 1*a* is shown a frontal view of the chip cell designated generally at 1. In the preferred embodiment, the chip cell, as shown in the figures, comprises two side members 2 and 3 each having an integral overlapping end portion to enclose the chips and associated spacers on both sides and both ends as viewed from above as in FIG. 1*b*. The tabs 4*a* on the spacers 4 are protected by the side members 2 and 3. The side members 2 and 3 have a pinch slot 5 therein and, as best shown in FIG. 2, there is a chip and spacer support member 6 at the lower extremity of the cell 1. Also shown in FIG. 2 is a spring member 7 extending across the width of the cell to which are fixedly attached the side members 2 and 3 such that the cell can be opened by pinching the lower extremity or spreading the upper extremity thereof. Thus, the side members 2 and 3 are pivotally associated at the lower extremity of the cell 1.

As heretofore mentioned, each of the spacer members 4 has a tab 4*a*. Between the spacer members 4 are located film chips 8 which in the hereinafter described application will be assumed to have a photographic emulsion thereon.

Figure 4:
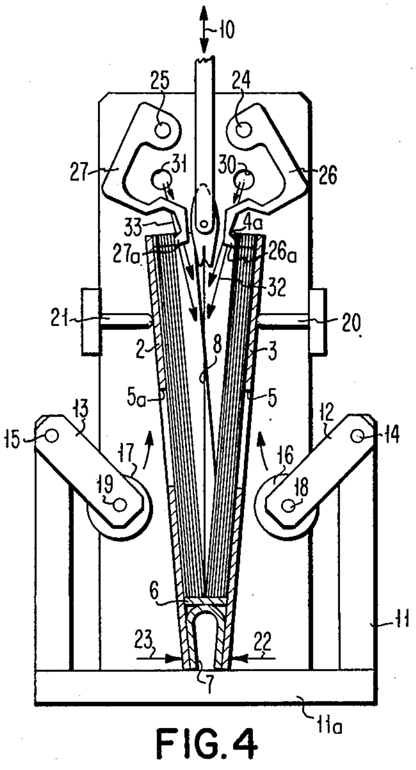
FIG. 4 is a side view showing the access mechanism during accessing of a selected chip.

The chips 8 are accessed by a picking head generally designated at 9 which grasps the selected chip as illustrated in FIG. 4 when it has been isolated and positioned on the picking axis 10. The picking mechanism and chip configuration may be of any of several types. However, the picking mechanism configuration and chip configuration actually used in the subject system is that described in co-pending application, Serial No. 205,999, by Clyde C. Roshon, entitled "Film Strip or Chip Picking Mechanism," assigned to the assignee of the subject application.

Figure 3:
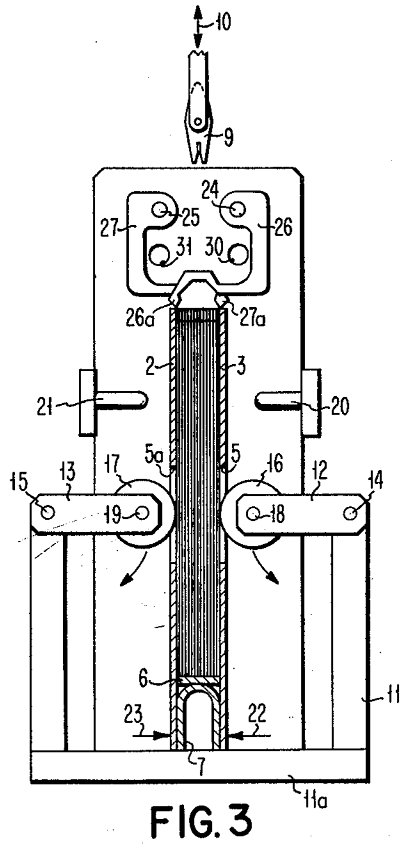
FIG. 3 is a section illustrating the first step of accessing a selected chip by the access mechanism.

In FIGS. 3, 4 is shown a section of the cell while located in the accessing mechanism as viewed from the front. In FIGS. 3 and 4 the chip cell is shown positioned in the accessing mechanism resting on a support ledge 11*a* of frame member 11. Pivotally attached to frame member 11 are two pinch roller arms 12 and 12 which are pivoted at points 14 and 15, respectively. Pinch rollers 16 and 17 are rotatably connected to pinch roller arms 12 and 13 at points 18 and 19, respectively. Connected to the upper extremity of frame member 11 are two side member stops 20 and 21 which are engaged by sides 3 and 2, respectively, when the cell is pinched (by means not shown) adjacent its lower extremities as shown at arrows 22 and 23. Any suitable pinching means such as solenoids or hydraulic pistons may be utilized.

Secured to tab spread drive rods 24 and 25 are tab spreaders 26 and 27 having integral tab spreader fingers 26*a* and 27*a* such that upon rotation of the tab spread drive rods, the tab spread fingers 26*a* and 27*a* will come in contact with two selected tabs 4*a* on the spacers 4 as will hereinafter be more fully described.

Figure 5:
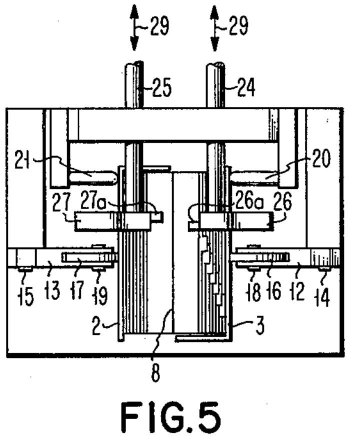
FIG. 5 is a top view of FIG. 4 without the picking head.

As best shown in FIG. 5, the tab spread drive rods 24 and 25 to which tab spreaders 26 and 27 are attached are movable by means not shown in the direction of arrows 28 and 29, such that the fingers 26*a* and 27*a* may be positioned transversely of the cell adjacent selected tabs. Upon rotation of the tab spread drive rods, a selected chip 8, as shown in FIGS. 4 and 5, may be isolated. A more complete description of the tab spreaders 26 and 27 and tab-type members 4 is contained in a copending application, Serial No. 793,542, by J. R. Geddes, entitled "Data Storage Access Mechanism," assigned to the assignee of the subject invention.

In operation, a closed cell having film chips which are to be selectively accessed, is delivered by means not shown to the accessing mechanism. As previously stated, each of the chips is separated by a tabbed spacer. The tabs 4*a* are arranged as depicted in FIG. 1*b* such that selective spreading of two adjacent tabs will provide access to a desired chip 8 stored therebetween. The fully loaded cell rests, as shown in FIG. 3, on a cell support ledge 11*a* on frame member 11. When the cell arrives at the accessing mechanism, pinch roller arms 12 and 13 are in the position as shown in FIG. 4 such that the cell may be received in the accessing mechanism. After the cell is in the accessing mechanism, arms 12 and 13 are rotated in an upward movement and the pinch rollers connected thereto pass through the pinch slots 5 and 5*a* to support the pack of chips and spacers. Prior to the time that the rollers 16 and 17 come in contact with the pack, the cell is held upright by pressure applied at points 22 and 23.

After the rollers 16 and 17 contact the pack, additional pressure is exerted in the direction of arrows 22 and 23 on the lower extremity of the chip cell such that, as shown in FIG. 4, the sides of the cell open. However, due to the pressure of rollers 16 and 17 through the pinch slots 5 and 5*a*, the pack is held rigid even through the sides 2 and 3 are no longer supporting it. The tabs 4*a* can now be accessed by the picking fingers 26*a* and 27*a*. The sides 2 and 3, as shown in the figures, are of sufficient length such that the tabs 4*a* are fully protected when the cell is closed and thus could not be accessed if the sides 2 and 3 were not open.

After the tab spread drive rods 24 and 25 have been positioned transversely of the pack to two selected tabs and rotated such that they are brought into pressure contact with the selected tabs, the pinch roller arms 12 and 13 are then pivoted downward thereby releasing the pack allowing the tab spreaders by action on the tabs to push the spacers and film chips apart as shown in FIG. 4. The selected chip 8 is thereby isolated for picking purposes. Erector air jets 30 and 31 are then energized to force a stream of air, as indicated by arrows 32 and 33, down through the chip pack. This air causes the chip to be centered on the picking axis regardless of whether or not it was in the center of the pack or on one side. Thus, a fixed picking axis 10 can be utilized without a vernier adjustment after the pack has been presented to the accessing mechanism. The air jets 30 and 31 not only serve to center the desired chip on the picking axis, but, additionally, the air acts as a bearing such that upon return or removal, the emulsion of the chip 8 is not damaged.

The reverse occurs during a chip return cycle. Thus, a cell 1 is inserted with rollers 16 and 17 retracted, then the rollers are extended through the pinch slots 5 and 5*a*. The lower extremity of the cell is pinched. The tab spreaders then are rotated to provide a chip slot. The air blast is turned on and the chip is inserted by the picker head 9. The picker head then retracts and the tab spreaders 26 and 27 are rotated out of contact with the tabs 4*a*. The rollers 16 and 17 are then retracted and pressure is removed from the lower extremity of the cell such that the spring 7 causes the sides 2 and 3 of the cell to close on the chip and spacer pack.

While in the preferred embodiment the invention has been described in an image storage and retrieval application, it is, of course, ideally suited for use in a magnetic data storage application. In a magnetic data storage application, since the oxide coatings are normally not easily damaged, the spacers in the pack could be eliminated and the tabs placed directly on the chips. This of course, would provide a large increase in storage capacity.

In summary, in the preferred embodiment, a sandwich clipboard type cell 1 is spring-loaded shut to hold a plurality of film chips 8 and tabbed spacers 4. The cell 1 can be opened either by squeezing the bottom or by spreading the top. A pinch roller access slot 5*a* is provided in each of two side plates 2 and 3 of the cell. In selecting a particular chip to be accessed by a picker head 9 having a fixed picking axis 10, the cell is first transported to the input/output station and positioned beneath the picker head. Pinch rollers 16 and 17 are inserted in the side plates of the cell to hold the chips and spacers rigid. The cell is then pinched at the lower extremity to open it. Tab spreaders 26 and 27 are next utilized to isolate the desired chip. An air stream is then played onto the selected chip which not only provides an air bearing for removal of the selected chip, but, additionally, centers the upper extremity of the selected chip on the picking axis of the picker head. Thus, the picker head may remain fixed with respect to the pack while picking any chip in the pack. In replacing an accessed chip, the reverse of the above sequence is followed.

It will be recognized by those skilled in the art that the heretofore described cell and access mechanism has several advantages. For instance, not only do the air jets center selected chips, but, due to the air jet lubrication, strip abrasion is virtually eliminated such that either magnetic or photographic emulsion coatings can be used. Moreover, due to the air jet arrangement, each of the chips is cleaned as they are replaced and retracted such that the air jets perform a triple function. Additionally, approximately double the storage density is provided in the cell as distinguished from those configurations wherein film chips are stored in slots on fixed centers. Likewise, due to the semi-enclosed configuration of the sides and overlapping end members and along with the spring action which holds the chips and spacers tightly, entrance of dust or other similar type particles into the cell during transport is virtually eliminated. Finally, the compact cell is readily conducive to pneumatic transport and is virtually damage resistant due not only to the rigid type construction, but additionally, due to the fact that the spacer tabs 4*a* are protected by the overlapping side members.

It will be further recognized by those skilled in the art that whereas in the heretofore described cell, the spacers are retained by friction that skewers may be utilized to hold the spacers. Additionally, it will be recognized that the tab spreaders may in an alternate configuration be replaced by air jets which selectively play on the tabs to provide a spreading action such that pneumatic logic can be used.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of data chips separated by tabbed spacers in said cell,
- means for biasing said side members of said cell such that said data chips and tabbed spacers are fixedly held thereby,
- means for spreading said side members such that said data chips and tabbed spacers are released;
- means operable to hold said data chips and tabbed spacers after said members are spread,
- means operable on said tabbed spacers to isolate a selected data chip, and
- means for positioning one extremity of said selected data chip on said access plane.

2. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of tabbed data chips,
- means for biasing said side members of said cell such that said data chips are fixedly held thereby,
- means for spreading said side members such that said data chips are released,
- means operable to hold said data chips after said side members are spread,
- means operable on said tabs to isolate a selected data chip, and
- means for positioning one extremity of said selected data chip on said access plane.

3. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of data chips separated by tabbed spacers in said cell,
- means for biasing said side members of said cell such that said data chips and tabbed spacers are fixedly held thereby,
- pinch slots in each of said side members,
- means operable with said pinch slots for selectively applying pressure to said deck,
- means for spreading said side members such that said data chips and tabbed spacers are released,
- means operable on said tabbed spacers to isolate a selected data chip, and
- means for positioning one extremity of said selected data chip on said access plane.

4. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of tabbed data chips in said cell,
- means for biasing said side members of said cell such that said data chips are fixedly held thereby,
- pinch slots in each of said side members,
- means operable with said pinch slots for selectively applying pressure to said deck,
- means for spreading said side members such that said data chips are released,
- means operable on said tabs to isolate a selected data chip, and
- means for positioning one extremity of said selected data chip on said access plane.

5. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of data chips separated by tabbed spacers in said cell,
- means for biasing said side members of said cell such that said data chips and tabbed spacers are fixedly held thereby,
- means for spreading said side members such that said data chips and tabbed spacers are released,
- means operable to hold said data chips and tabbed spacers after said side members are spread.
- tab spreaders operable on said tabbed spacers to isolate a selected data chip, and
- means for positioning one extremity of said selected data chip on said access plane.

6. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of data chips separated by tabbed spacers in said cell,
- means for biasing said side members of said cells such that said data chips and tabbed spacers are fixedly held thereby,
- pinch slots in each of said side members,
- means operable with said pinch slots for selectively applying pressure to said deck,
- means for spreading said side members such that said data chips and tabbed spacers are released,
- means operable on said tabbed spacers to isolate a selected data chip, and
- means for positioning one extremity of said selected data chip on said access plane.

7. In a data storage and retrieval system wherein information is stored on data chips which are contained in a plurality of cells which may be selectively transported to an input/output terminal such that a desired data chip may be positioned on a fixed access plane, the combination comprising:
- a cell including two side members pivotally associated at one extremity thereof,
- a deck containing a plurality of data chips separated by tabbed spacers in said cell,
- means for biasing said side members of said cell such that said data chips and tabbed spacers are fixedly held thereby, means for spreading said side members such that said data chips and tabbed spacers are released, means operable to hold said data chips and tabbed spacers after said side members are spread, tab spreaders operable on said tabbed spacers to isolate a selected data chip, and air jet means operable to position one extremity of said selected data chip on said access plane.

8. In a data storage and retrieval system wherein information is stored on data chips which are contained in a plurality of cells which may be selectively transported to an input/output terminal such that a desired data chip may be positioned on a fixed access plane, the combination comprising:

a cell including two side members pivotally associated at one extremity thereof, a deck containing a plurality of data chips separated by tabbed spacers in said cell, means for biasing said side members of said cell such that said data chips and tabbed spacers are fixedly held thereby, pinch slots in each of said side members, means operable with said pinch slots for selectively applying pressure to said deck, means for spreading said side members such that said data chips and tabbed spacers are released, tab spreader means operable on said tabbed spacers to isolate a selected data chip, and air jet means operable to position one extremity of said selected data chip on said access plane.

9. In a data storage and retrieval system wherein information is stored on data chips which are contained in a plurality of cells which may be selectively transported to an input/output terminal such that a desired data chip may be positioned on a fixed access plane, the combination comprising:

a cell including two side members pivotally associated at one extremity thereof, a deck containing a plurality of data chips separated by tabbed spacers in said cell arranged such that said side members everywhere overlap said data chips and tabbed spacers, means for biasing said side members of said cell such that said data chips and tabbed spacers are fixedly held thereby, pinch slots in each of said side members, roller means operable with said pinch slots for selectively applying pressure to said deck, means for spreading said side members such that said data chips and tabbed spacers are released, tab spreading means operable on said tabbed spacers to isolate a selected data chip, and air jet means operable to position one extremity of said selected data chip on said access plane.

No references cited.